United States Patent
Denyer et al.

(10) Patent No.: US 6,486,911 B1
(45) Date of Patent: Nov. 26, 2002

(54) OPTOELECTRONIC SENSOR WITH SHUFFLED READOUT

(75) Inventors: Peter Brian Denyer, Edinburgh (GB); Jonathan Ephriam David Hurwitz, Edinburgh (GB); Stewart Gresty Smith, Edinburgh (GB)

(73) Assignee: VLSI Vision Limited, Edinburgh (GB)

( * ) Notice: Subject to any disclaimer, the term of this patent is extended or adjusted under 35 U.S.C. 154(b) by 0 days.

(21) Appl. No.: 09/029,916

(22) PCT Filed: Nov. 29, 1996

(86) PCT No.: PCT/GB96/02936

§ 371 (c)(1),
(2), (4) Date: Mar. 10, 1998

(87) PCT Pub. No.: WO97/20434

PCT Pub. Date: Jun. 5, 1997

(30) Foreign Application Priority Data

Nov. 29, 1995 (GB) .............................................. 9524337

(51) Int. Cl.⁷ ............................................... H04N 5/335
(52) U.S. Cl. .................................... 348/308; 348/272
(58) Field of Search ............................... 348/294, 300, 348/301, 302, 304, 308, 272, 273, 278, 280, 279; 250/208.1; H04N 5/335

(56) References Cited

U.S. PATENT DOCUMENTS

| 4,802,001 A | 1/1989 | Tabei et al. |
| 4,989,075 A | 1/1991 | Ito |
| 5,194,944 A | 3/1993 | Uchiyama et al. |
| 5,452,004 A | * 9/1995 | Roberts ....................... 348/301 |
| 5,808,677 A | * 9/1998 | Yonemoto ................... 348/308 |
| 5,841,126 A | * 11/1998 | Fossum et al. .......... 250/208.1 |

FOREIGN PATENT DOCUMENTS

| DE | 3 828 867 | 3/1989 |
| EP | 0 605 898 | 7/1994 |
| GB | 2 175 173 | 11/1986 |

* cited by examiner

Primary Examiner—Tuan Ho
(74) Attorney, Agent, or Firm—Alston & Bird LLP

(57) ABSTRACT

An integrated circuit suitable for use as a multi-spectral image array sensor (1) comprises an array of pixels (2) for sensing radiation of different wavelengths e.g. different colours. The array has at least one row of cells containing a plurality of series (R,G) of pixels which series are interspersed with each other. Each series consists essentially of pixels (2) for sensing radiation of substantially the same wavelength e.g. the same colour. At least two horizontal shift registers (16,18) are provided, each register being coupled to pixels (2) of a respective one of the plurality of series (R,G) of pixels so as to enable the outputs from the pixels of each series to be read out consecutively at an array output (11). In a preferred embodiment the pixels (2) are preferably arranged in a Bayer matrix of Red, Green and Blue pixels and two interleaved shift registers (16,18) are provided for reading out the pixel outputs for each colour consecutively, in each row. In an alternative embodiment, an address decode system (40, 41, 42) is used to read out the pixel outputs instead of horizontal shift registers. The integrated circuit may be provided in a camera head (22) and/or in a solid state camera system (20) incorporating a signal processor (28) for demultiplexing the pixel outputs into a plurality of channels e.g. different colour channels (R, G, B).

37 Claims, 2 Drawing Sheets

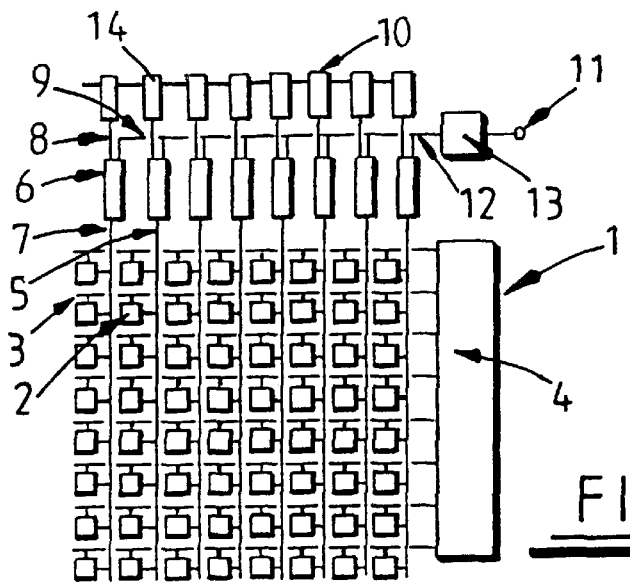
FIG. 1
| $G_1$ | $R_1$ | $G_2$ | $R_2$ | $G_3$ | $R_3$ | $G_4$ | $R_4$ |
|---|---|---|---|---|---|---|---|
| B | G | B | G | B | G | B | |
| G | R | G | R | G | R | G | |
| B | G | B | G | B | G | B | |
| G | R | G | R | G | R | G | |
FIG. 2
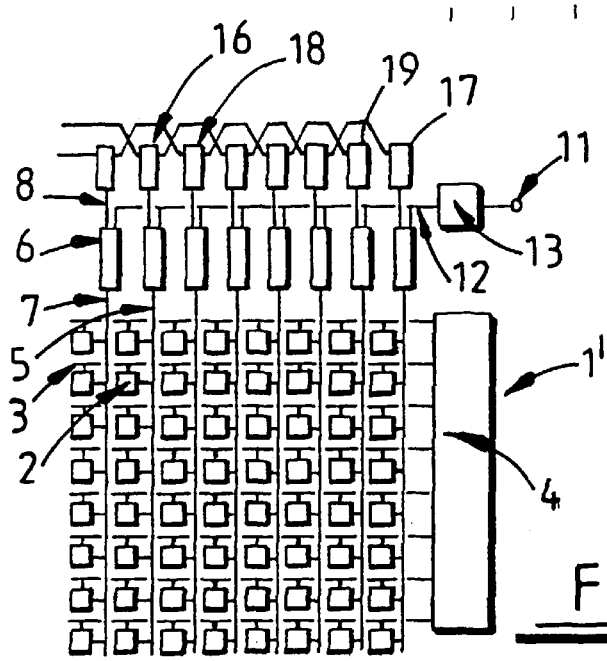
FIG. 3

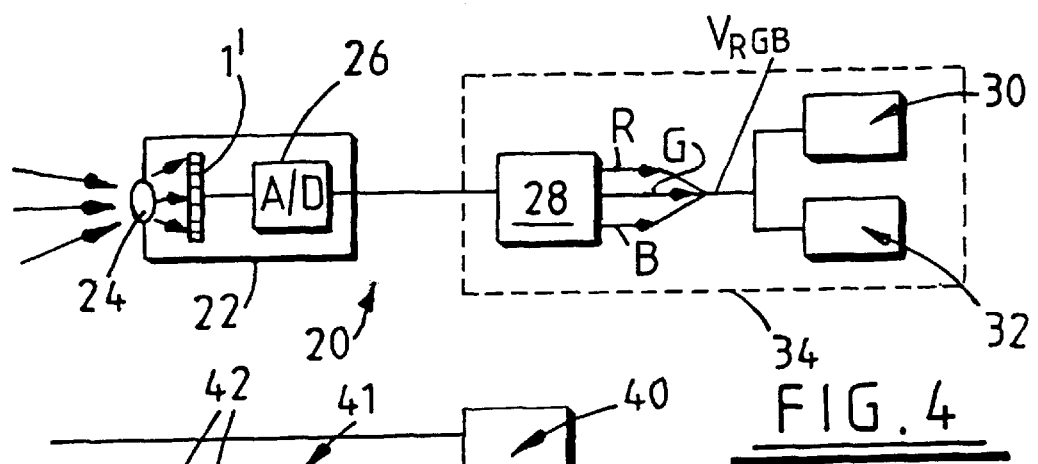
FIG. 4
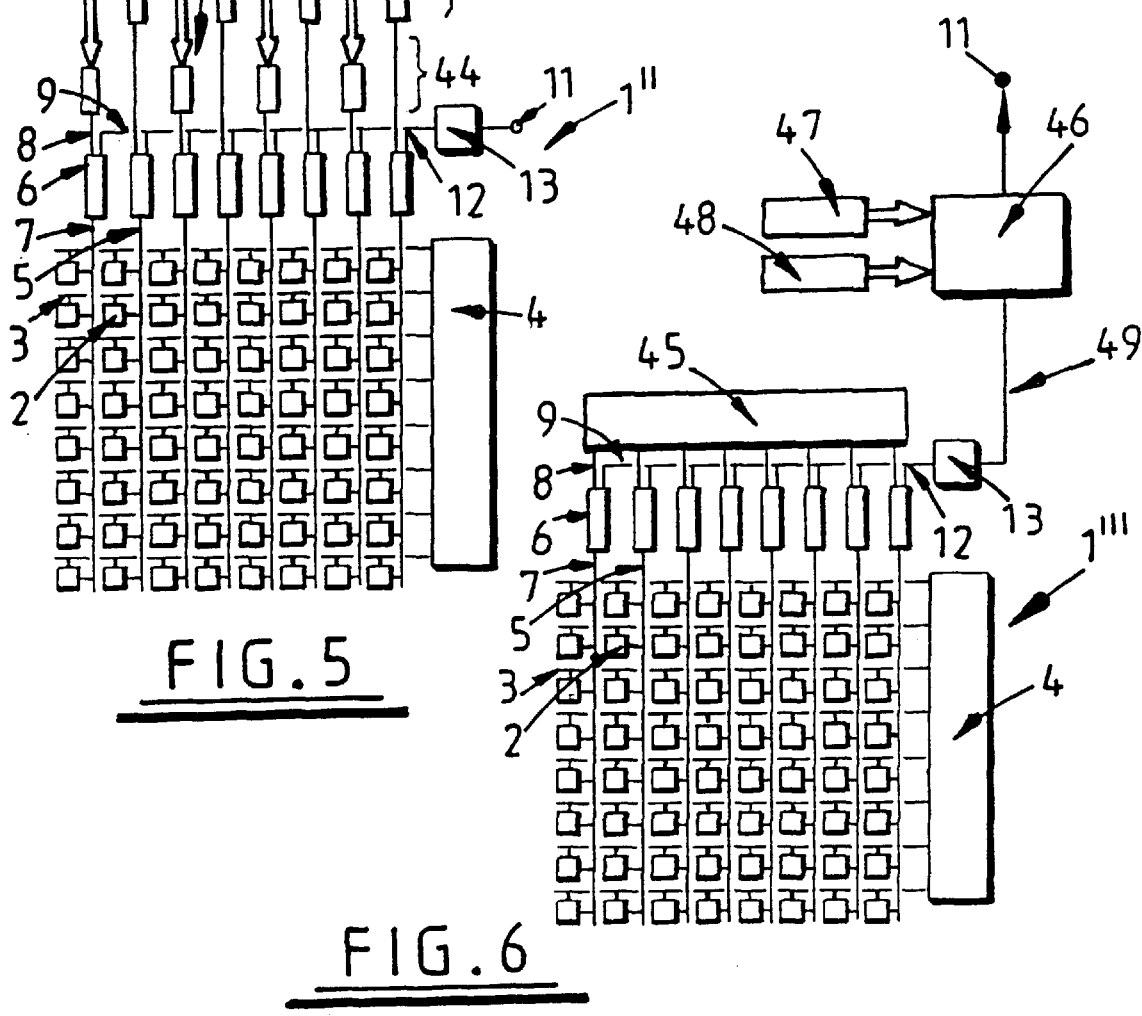
FIG. 5
FIG. 6

OPTOELECTRONIC SENSOR WITH SHUFFLED READOUT

BACKGROUND OF THE INVENTION

The present invention relates to integrated circuits (I.C.s) suitable for use as image array sensors, and in particular, for use as multi-spectral image array sensors.

I.C. image array sensors are commonly used in solid state cameras and colour image sensors are known which comprise a two-dimensional array of sensing cells which is provided with a matrixed pattern of colour filters, for example, red, green and blue filters. The array has a plurality of rows and columns of sensing cells and outputs from the sensing cells are read out individually, row by row, at a single array output the output of neighbouring cells being read sequentially. Horizontal and vertical shift registers are normally used for this purpose. Cell outputs corresponding to different colours are demultiplexed at the array output and fed to respective colour channels.

Commonly, neighbouring sensing cells in the array have different colour filters in order to achieve appropriate spatial sampling of radiation of each colour being sensed for each colour channel of the sensor. Since the outputs of neighbouring cells are read out sequentially, the cell outputs form a signal stream at the array output of inherently fluctuating form due to the different colour radiation sensed by neighbouring cells —even in image areas which have a constant colour across a number of neighbouring cells, where that colour corresponds to different signal levels on the different colour channels. This fluctuating signal results in one or more relatively high frequency signal components at the array output whose amplitude is related to background chromaticity as well as to image scene luminance.

Such high frequency signal component(s) lead to interference between neighbouring sensing cell output signals and consequently to corruption of the image chromaticity interpreted by circuits which follow the sensor, producing visual image error effects in a camera in which the sensor is used. Moreover, if the sensing cell matrixed colour filter pattern is not the same in all respects for each row of the array, then the resulting chromaticity errors also differ from row to row, producing more visually offensive image errors.

Additionally, the fluctuating signal stream at the array output including the associated spurious high frequency signal components, can be difficult to handle in the analogue domain in which such image array sensors normally operate.

BRIEF SUMMARY OF THE INVENTION

It is an aim of the present invention to overcome or reduce one or more of the foregoing disadvantages.

According to a first aspect of the invention we provide an integrated circuit suitable for use as a multi-spectral image array sensor in a solid state camera system having a plurality of channels for radiation of different wavelengths, the integrated circuit comprising an array of sensing cells having at least one row of sensing cells, each sensing cell being formed and arranged for sensing radiation corresponding to one of said channels, said at least one row containing a plurality of series of sensing cells which series are interspersed with each other in a predetermined manner, each series consisting essentially of sensing cells for a respective one of said plurality of channels, and readout means for reading signal outputs from the cells in said at least one cell row of the array, wherein said readout means is adapted to read consecutively, in use of the integrated circuit, the signal outputs from the sensing cells in each one of said plurality of series of cells in said at least one row.

One advantage of the integrated circuit according to the invention is that the sensing cell outputs for the cells of at least two series, preferably each series, of cells in said at least one row, can be read out consecutively at the array output. Thus, the cell outputs from sensing cells for the same channel of said plurality of channels can be read out consecutively. This minimises fluctuation in the array output signal stream due to variations in individual cell output signals from cells formed and arranged for sensing radiation of different wavelengths since the difference in radiation and hence signal level between successive cells for the same channel are often much smaller than the difference in radiation and hence signal level between neighbouring cells for different channels.

The readout means may comprise an address decode system which is configured to read consecutively the outputs from the sensing cells in each one of said plurality of series of cells in said at least one row of the array.

Alternatively, and preferably, the readout means comprises horizontal scanning means coupled to each cell in the array for scanning said at least one cell row of the array, wherein the horizontal scanning means comprises at least two horizontal shift register means, each horizontal shift register means being coupled to the cells of a respective one of said plurality of interspersed series of cells.

The array of sensing cells may be a one-dimensional array having a single row of sensing cells. Such an array may, for example, be suitable for use in an image scanning device.

Preferably, the array is a two-dimensional array having a plurality of rows and columns of sensing cells with a vertical scanning means also coupled to each cell in the array. Each row of cells of the two-dimensional array may contain a plurality of series of sensing cells which series are interspersed with each other in a predetermined manner, each series consisting essentially of sensing cells for a respective one of said plurality of channels. Preferably, each row contains the same number of interspersed series of sensing cells. Preferably, the plurality of series of cells contained in each row are interspersed in the same predetermined manner. The number of horizontal shift register means provided is also preferably equal to the number of said interspersed series of cells in each row. Thus, the sensing cell outputs for each series of cells in each row can be read out consecutively.

Each horizontal shift register means preferably comprises at least one horizontal shift register. Thus it would be possible to have more than one horizontal shift register for a given series of cells.

Adjacent sensing cells in each row may be formed and arranged for sensing radiation of wavelengths corresponding to different ones of said plurality of channels. The integrated circuit may be suitable for use as a colour image sensor wherein said plurality of channels are for radiation corresponding to respective different colours. For example, there may be three colour channels corresponding respectively to red, green and blue radiation wavelengths. Each row may, for example, contain three series of sensing cells, for sensing red, green and blue wavelength radiation respectively. The three series of cells may be interspersed such that each row contains an alternating pattern of red (R), green (G), and blue (b), sensing cells e.g. R G B R G B R G . . . Alternatively, each row may, for example, contain only two series of sensing cells. The two series of cells in each row may be arranged so that every third cell senses a different colour radiation to every first and second cell e.g. B B R B B R B B R . . . Said interspersed series of sensing cells contained in any one row may comprise sensing cells for sensing at least one different colour radiation to the sensing cells of the interspersed series of cells in another row. For example, a first row may contain two series of cells for sensing red and blue radiation and a second row may contain two series of cells for sensing red and green radiation. Where each row contains two interspersed series of cells, the array of cells may be arranged in a Bayer matrix pattern in which the two series of cells in each odd-numbered row are interspersed to form an alternating pattern of cells for sensing a first colour and a second colour, e.g. G R G R G R . . . , and the two series of cells in each even-numbered row are interspersed to form an alternating pattern of cells for sensing the first colour and a third colour, e.g. B G B G B G . . . With this arrangement, there are preferably provided two horizontal shift registers for reading the outputs from the sensing cells of respective ones of the two interspersed series of cells in every row of the array.

The or each horizontal shift register of each said horizontal shift register means preferably comprises a plurality of shift register elements each of which elements is coupled to a respective one of the sensing cells in each row of the array. The shift register elements of said at least two horizontal shift register means may conveniently be interleaved to provide a compact arrangement of the horizontal shift registers in the integrated circuit layout. For example, where the sensing cells of the array are arranged in a Bayer matrix pattern and two horizontal shift registers are provided, the shift register elements may be interleaved in an alternating pattern.

The integrated circuit is preferably fabricated using MOS or CMOS technology.

The integrated circuit may additionally be capable of sensing radiation at non-visible wavelengths, for example, infra-red radiation. Thus, for example, at least one of said plurality of channels may be for infra-red or other non-visible radiation and some of the sensing cells may consequently be for sensing infra-red or other non-visible radiation respectively.

The array of sensing cells may include a matrixed pattern of filters corresponding to different radiation wavelengths so as to enable essentially similar sensing cells to sense radiation at a particular wavelength, or over a particular band of wavelengths, corresponding to a respective one of said plurality of channels. Alternatively there could be cells having sensing surfaces responsive to different radiation wavelengths.

According to a second aspect of the invention we provide a method of reading the outputs of individual sensing cells of an array of sensing cells fabricated in an integrated circuit suitable for use as a multi-spectral image array sensor in a solid camera system having a plurality of channels for radiation of different wavelengths, the array comprising at least one row of sensing cells, said at least one row containing a plurality of series of sensing cells which series are interspersed with each other in a predetermined manner and each series consisting essentially of sensing cells for a respective one of said plurality of channels, wherein the method comprises reading consecutively the sensing cell output signals from the cells in each one of said plurality of series of cells in said at least one row.

The method preferably uses a separate horizontal shift register means to read the cell outputs for the cells of respective ones of the plurality of interspersed series of cells in said at least one row.

Where the array of sensing cells is a two-dimensional array having a plurality of rows and columns, each row containing a plurality of series of sensing cells which series are interspersed with each other in a predetermined manner, each series consisting essentially of sensing cells for a respective one of said plurality of channels, the method comprises reading consecutively the sensing cell output signals from the cells in each one of said plurality of series of cells in each row.

Preferably, the sensing cell outputs signals from the cells in each one of said plurality of series of cells in said at least one row are read consecutively into signal processing means which are adapted to demultiplex said sensing cell output signals into respective ones of said plurality of channels for radiation of different wavelengths.

According to a third aspect of the invention we provide a solid state camera head incorporating at least one lens and an integrated circuit as aforedescribed.

According to a fourth aspect of the invention we provide a solid state camera system having a plurality of channels for radiation of different wavelengths and incorporating an integrated circuit as aforedescribed.

According to a fifth aspect of the invention we provide signal processing means suitable for use in a solid state camera system and adapted to receive and demultiplex streams of output signals from sensing cells of an image sensing array of the camera system, said array having at least one row of sensing cells containing a plurality of series of sensing cells interspersed in a predetermined manner, each series consisting essentially of sensing cells for a respective one of a plurality of channels for radiation of different wavelengths in the solid state camera system, said signal processing means being adapted to demultiplex a shuffled stream of output signals from sensing cells in said at least one row into respective ones of said plurality of channels, in which shuffled stream of output signals the output signals from the sensing cells in each one of said plurality of series of cells in said at least one row are arranged consecutively.

Preferably, the signal processing means is adapted to receive streams of output signals from each row of a two-dimensional image sensing array of the solid state camera system, each row comprising a plurality of series of sensing cells interspersed with each other in a predetermined manner and each series consisting essentially of sensing cells for a respective one of said plurality of channels, said signal processing means being adapted to demultiplex a shuffled stream of sensing cell output signals from each row into respective ones of said plurality of channels, wherein in each said shuffled stream of output signals the output signals from the sensing cells in each one of said plurality of series of cells in the respective row are arranged consecutively.

According to a sixth aspect of the invention we provide a data recording medium having recorded thereon image data comprising at least one shuffled sensing cell output signal stream from an image sensing array having at least one row of sensing cells, said at least one row comprising a plurality of series of sensing cells interspersed with each other in a predetermined manner and each series consisting essentially of sensing cells for sensing a predetermined range of wavelengths of electromagnetic radiation, in which said at least one shuffled sensing cell output signal stream the output signals from the sensing cells in each one of said plurality of series of cells are arranged consecutively.

BRIEF DESCRIPTION OF THE SEVERAL VIEWS OF THE DRAWINGS(S)

Preferred embodiments of the invention will now be described by way of example only and with reference to the accompanying drawings in which:

FIG. 1 depicts schematically the architecture of a known I.C. image array sensor;

FIG. 2 illustrates schematically a portion of a two-dimensional colour image sensor array wherein the sensing cells are arranged according to a Bayer matrix;

FIG. 3 depicts the architecture of an I.C. image array sensor according to one aspect of the present invention;

FIG. 4 illustrates schematically the layout and components of a solid state camera system in which the sensor of FIG. 1 may be incorporated;

FIG. 5 depicts the architecture of an alternative I.C. image array sensor according to the invention; and FIG. 6 depicts a further alternative I.C. image array sensor architecture according to another embodiment of the invention.

DETAILED DESCRIPTION OF THE INVENTION

A known type of image array sensor 1 fabricated as an integrated circuit is illustrated schematically in FIG. 1. Such a sensor is described in detail in our British Patent No. 2 252 886 B. The sensor 1 consists of an array of pixels 2 laid out in generally rectangular format in rows and columns. Each pixel 2 in a row is connected to a common horizontal line called a word-line 3 and each word line is connected to digital circuitry 4 which is used to generate and drive the necessary pattern of row-select signals along the word lines. This circuitry 4 generally takes the form of a vertical shift register. Each vertical column of pixels is connected to a common conductor known as a bit-line 5 which is connected to a respective separate individual analogue switch sense amplifier circuit 6 at the top of said column (as viewed in FIG. 1). The amplifier circuit 6 has two inputs 7, 8 and one output 9. One input 8 is coupled to a horizontal shift register 10 which produces enabling signals that control the analogue switch sense amplifier circuits 6 to enable the signals on consecutive bit-lines to be connected to a main output 11 of the array. The output 9 of each amplifier 6 is connected to a common conductor 12 which functions as a common read out line and which is connected to a sense amplifier 13. The amplifier 13 has an output which constitutes the main array output 11.

The horizontal shift register 10 has a plurality of shift register elements 14 each one of which is coupled to the input 8 of a respective one of the amplifier circuits 6. The sensor operates a "single channel" readout scheme in which pixel outputs are read row by row and outputs from adjacent pixels in each row are read sequentially by the horizontal shift register elements and fed to the main array output 11 to form a signal stream of pixel outputs. To enable the integrated circuit to function as a colour image array sensor the pixel array is treated with a matrixed pattern of colour filters. Adjacent pixels have different colour filters so as to achieve satisfactory spatial sampling of each colour type.

The signal stream at the main array output 11, consisting of sequential pixel outputs for each row of the array, is demultiplexed, by additional circuitry (not shown) of the integrated circuit, and interpolated to form synchronous parallel colour signals for a plurality of corresponding colour channels of the sensor or, more specifically, of the solid state camera system in which the sensor 1 is normally incorporated.

In one embodiment of this type of colour image array sensor the matrixed pattern of colour filters is a Bayer matrix as described in U.S. Pat. No. 3,971,065. A portion 15 of a Bayer matrix is shown schematically in FIG. 2, in which each row of the array comprises two series of pixels, all the pixels of each series having the same colour of filter, the colour filters of the pixels in each series being either red (R), green (G) or blue (B), and the two series of pixels in each row being interspersed so as to form an alternating two-colour pattern e.g. G R G R G R . . . etc. The first and every subsequent odd-numbered row have the pixel colour pattern G R G R G R . . . and the second and every subsequent even-numbered row have the pixel colour pattern B G B G B G . . .

The Bayer matrix pixel array pattern shown in FIG. 2 has many favourable properties for colour image reconstruction, but chromaticity errors are introduced to the reconstructed image due to the single channel readout scheme in which all the pixels in each row are output sequentially under the control of the horizontal shift register 10. For example, row one of the array is output in the sequence G1, R1, G2, R2, G3, R3, G4, R4 . . . For an area of the image containing a cyan hue, for example, this sequence may look like: 1, 0, 1, 0, 1, 0, 1, 0 . . . Such a sequence produces a spurious high frequency signal at the Nyquist frequency (i.e. half the pixel sampling frequency), whose amplitude is related to the background chromaticity, and which can also be difficult to handle in the analogue domain.

FIG. 3 illustrates schematically an image array sensor 1' according to the present invention in which the horizontal shift register 10 has been replaced by two horizontal shift registers 16, 18. The other components of the sensor are the same or similar to those shown in the sensor of FIG. 1 and are accordingly referenced using like numerals. The array of pixels 2 follows the Bayer matrix pattern of filter colours shown in FIG. 2. The plurality of shift register elements 17, 19 of the two horizontal shift registers 16, 18 are interleaved alternately, and the shift register elements 17 of one of the horizontal shift registers 16 are coupled to one series of like coloured pixels in each row via respective alternate ones of the amplifier circuits 6 and the shift register elements 19 of the other of the horizontal shift registers 18 are coupled to the other one of the series of like-coloured pixels in each row via separate respective ones of the amplifier circuits 6.

By first using one horizontal shift register 16 to read the alternate pixel outputs corresponding to one colour of pixels in the first row, and then using the second shift register 18 to read the pixel outputs of the other colour of pixels in that row, the output signal stream for that row, at the main array output 11, becomes: G1, G2, G3, G4 . . . , R1, R2, R3, R4, . . . For example, for a cyan hue this reads as: 1, 1, 1, 1, . . . , 0, 0, 0, 0, . . . The latter re-arranged or "shuffled" sequence eliminates the spurious high frequency components associated with the known single horizontal shift register arrangement of FIG. 1 and is generally easier to handle in the analogue domain. Each row of pixel outputs is read in this manner, by the two horizontal shift registers 16, 18 to produce a shuffled pixel output signal stream.

FIG. 4 shows schematically the layout of a solid state camera system 20 incorporating the image array sensor of FIG. 3(referenced 1' in FIG. 4). The camera system includes a camera head 22 comprising a lens 24 and the image array sensor 1'. The array is read row-by-row, the shuffled signal stream of pixel outputs read out at the main array output 11 of the sensor 1'being fed to an analogue to digital convertor 26 where the pixel outputs are converted from analogue to digital signals which are subsequently fed to a signal processing unit 28 which is configured and/or programmed to demultiplex the shuffled pixel output streams into red green and blue colour channels (R.G.B) of a video signal $V_{RGB}$ which is output by the processing unit 28 to a video display unit 30, and/or a recording device 32, coupled to the processing unit 28. (The processing unit preferably also interpolates the red, green and blue channel signals to form synchronous, parallel colour channel signals for the video signal $V_{RGB}$ before being output to the display unit 30, and/or recording device 32.) In the embodiment illustrated in FIG. 4 the processing unit 28 is provided on a second integrated circuit which is provided together with the display unit 30 and/or recording device 32 in an image processing unit or module 34 (indicated in broken lines in FIG. 4) of the camera system 20 for use with the camera head 22. The A/D convertor 26 is provided in circuitry incorporated in the camera head 22, (which could, if desired, be integrally provided in the image sensor integrated circuit 1'). The second integrated circuit may also include colour balance control circuitry and/or exposure control circuitry of the camera system.

It is envisaged that the camera head 22 need not always be used with the image processing unit 34 shown in the camera system of FIG. 4. It would be possible, for example, for image data output from the image sensor 1' in the camera head 22 to be fed straight to a recording device where the shuffled output signal streams would be recorded on a recording medium (e.g. a computer hard disk, or a floppy disk). The recorded image data (in its shuffled output signal stream form) would be demultiplexed into colour channels to form a video signal and/or image at a later date by reading the recorded data into a suitably programmed processor.

In an alternative embodiment (not shown) the A/D convertor 26 is incorporated in the image processing unit 34, rather than in the camera head. Similarly, in a further possible embodiment (not shown) A/D conversion and some, or all, of the signal processing performed by the processing unit 28 is carried out in the camera head 22. This may be done, for example, by processing circuitry included on the same chip as that on which the integrated circuit image array sensor 1' is formed. The processing circuitry on the chip may thus be configured to digitally format the image data output from the sensor 1' and to convert the formatted data into a standard video form which can be input directly to a video display unit and/or recorder device, or stored in an external memory for future use. Alternatively, the processing circuitry on the chip may be configured to convert the image data output from the sensor 1' into a particular digital format, the formatted data then being output from the camera head 22 to further external signal processing circuitry which is programmed, or configured, to interpret the formatted data and produce therefrom a standard video signal (e.g. in three channel R, G, B form) for use as before.

It will be appreciated that the number of horizontal shift registers may be chosen according to the type of colour pixel array pattern which is used in the sensor. For example, where three colours of pixel are disposed in each row to form three interspersed series of pixels, the horizontal shift registers may be used so as to read the pixel outputs for each series of like-coloured pixels consecutively e.g. G, G, G, . . . , R, R, R, . . . , B, B, B, . . .

It will also be appreciated that the invention is suitable for multi-spectral sensors in which some of the pixels are treated so as to sense non-visible radiation which may, for example, be infra-red radiation.

The invention is also applicable to one-dimensional image array sensors in which there is a single row of different colour pixels. (In such an embodiment, no vertical shift register 4 is necessary).

It will moreover be appreciated that further modifications and variations are possible without departing from the scope of the invention. For example, the pixel array may incorporate only pixels treated with cyan, magenta and yellow filters. Each row may also contain one or more additional pixels for use in measuring light intensity or another reference quantity which may be of interest, although the number of such pixels in each row will normally be relatively small.

FIG. 5 illustrates an alternative embodiment of the invention in which an address decode system is used instead of the interleaved shift registers 16, 18 of the FIG. 3 embodiment. Like components of the sensors shown in FIGS. 3 and 5 are referenced by like numerals. In the sensor 1" of FIG. 5, an address generator 40 generates a sequence of addresses 41 which are decodable by decode elements 42 coupled to the top of the pixel columns 5. The address generator 40 and decode elements 42 are arranged to read out the pixel output signals, row-by-row, reading out groups of like-coloured pixels consecutively to achieve the same effect as in FIG. 3, where the two horizontal shift registers were used. In a Bayer matrix array therefore, the shuffled output signal stream for each row is made up of the outputs from two colours of pixel e.g. R, G shuffled into like-coloured groupings R, R, R . . . , G , G, G, . . . As indicated in FIG. 5, a decode element 42 is coupled to the top of each column, there thus being two sets of decode elements: one set 43 linked to alternate pixels in each row having one colour, and the other set 44 linked to alternate pixels in each row having another colour.

FIG. 6 shows another possible embodiment of the invention in which a sensor 1" uses another "shuffling" technique to obtain the desired shuffled output signal streams from each row of the array. In this embodiment, each row of pixels 2 in the array is read out sequentially by read out means 45 which may comprise one or more shift registers, or alternatively, address decode circuitry, for reading the pixels sequentially. The pixel output signal stream from each row output from the common read out line 12 and the sense amplifier 13 is input to a memory circuit 46 which is included in the output path 49 of the sensor 1", between the amplifier 13 and the main array output 11. This memory circuit 46 is accessed by an input addressing means 48, and an output addressing means 47, so as to order the pixel output signals for each row into like-coloured pixel groups, thereby obtaining similar shuffled output signal streams as with the FIGS. 3 and 5 embodiments. The memory circuit 46 may consist of purely analogue storage means, or may be achieved through Analog-Digital conversion followed by digital storage means.

In any of the above described embodiments,(FIGS. 3–6) there may be provided a plurality of read out lines 12 and respective sense amplifiers 13 (instead of a single read out line and amplifier). In such arrangements, the same shift register arrangements 16, 18 as in FIG. 3, or address decoding systems as in FIG. 5 or FIG. 6 would be used, but the additional read out lines 12 and amplifiers 13 enable the realisation of differential array read out schemes and/or these additional read out lines 12 and amplifiers 13 can be time interlaced to speed up the access time to the sensor.

What is claimed is:

1. An integrated circuit CMOS muti-spectral image array sensor for use in a solid state camera system having a plurality of channels for radiation of different wavelenghts, the sensor comprising an array of sensing cells having at least one row of sensing cells, each sensing cell in said at least one row being formed and arranged for sensing radiation corresponding to one of said channels, said at least one row containing a plurality of sensing cells which series are interspersed with each other in a predetermined manner, each series consisting essentially of sensing cells for a respective one of said plurality of channels, and read out means for reading signal outputs from the cells in said at least one cell row of the array, wherein said read out means is adapted to read out selectively, in use of the sensor, the signal outputs from the sensing cells in one of said plurality of series of cells in said at least one row, with the cells in said series being read out consecutively, and then to read out selectively the signal outputs from the sensing cells in another one of said series of cells, via a single common read out line coupled to the sensing cells in each one of said plurality of series of cells so that the signal outputs from the series of sensing cells for each said channel are read as a consecutive series separately from a consecutive series of signal outputs from the series of sensing cells for another said channel.

2. An integrated circuit CMOS sensor according to claim 1, wherein said read out means comprises an address decode system which is configured to read consecutively the outputs from the sensing cells in each one of said plurality of series of cells in said at least one row of the array.

3. An integrated circuit CMOS sensor according to claim 1, wherein said read out means comprises horizontal scanning means coupled to each cell in the array for scanning said at least one cell row of the array, and wherein said horizontal scanning means comprises at least two horizontal shift register means, each said horizontal shift register means being coupled to the cells of a respective one of said plurality of interspersed series of cells.

4. An integrated circuit CMOS sensor according to claim 1, wherein the sensing cells in each one of said plurality of series of cells in said at least one row are coupled indirectly to said single read out channel via amplifier means.

5. An integrated circuit CMOS sensor according to claim 1, wherein the array of sensing cells is a one-dimensional array having a single row of sensing cells.

6. An integrated circuit CMOS sensor according to claim 1, wherein the array is a two-dimensional array having a plurality of rows and columns of sensing cells and the sensor further includes vertical scanning means.

7. An integrated circuit CMOS sensor according to claim 6 wherein each row of cells of said two-dimensional array contains a plurality of series of sensing cells which series are interspersed with each other in a predetermined manner, each series consisting essentially of sensing cells for a respective one of said plurality of channels.

8. An integrated circuit CMOS sensor according to claim 7 wherein each row contains the same number of interspersed series of sensing cells.

9. An integrated circuit CMOS sensor according to claim 6 wherein said plurality of series of cells contained in each row are interspersed in the same predetermined manner.

10. An integrated circuit CMOS sensor according to claim 3 wherein the array is a two-dimensional array having a plurality of rows and columns of sensing cells and the sensor further includes vertical scanning means, each row of cells of said two-dimensional array containing a plurality of series of sensing cells which series are interspersed with each other in a predetermined manner, each series consisting essentially of sensing cells for a respective one of said plurality of channels, and each row containing the same number of interspersed series of sensing cells, and wherein the number of horizontal shift register means provided is equal to the number of said interspersed series of cells in each said row.

11. An integrated circuit CMOS sensor according to claim 10, wherein each said horizontal shift register means comprises at least one horizontal shift register.

12. An integrated circuit CMOS sensor according to claim 11, wherein each said horizontal shift register comprising a plurality of shift register elements each of which elements is coupled, via a respective switch sense amplifier means, to a respective one of the sensing cells in a respective one of said series of sensing cells in said at least one row of array, each said switch sense amplifier means being coupled to said signal read out channel.

13. An integrated circuit CMOS sensor according to claim 12, wherein the shift register elements of said horizontal shift registers of said at least two horizontal shift register means are interleaved whereby a compact arrangement of said horizontal shift registers in the sensor is achieved.

14. An integrated circuit CMOS sensor according to claim 6 wherein each said row of sensing cells contains two interspersed series of cells, the two series of cells in each row being interspersed to form an alternating pattern.

15. An integrated circuit CMOS sensor according to claim 14 wherein each said series of sensing cells consists essentially of cells for sensing visible radiation of one particular colour.

16. An integrated circuit CMOS sensor according to claim 15, wherein the two series of cells in each odd-numbered row are interspersed to form an alternating pattern of cells for sensing a first colour and a second colour and the two series of cells in each even-numbered row are interspersed to form an alternating pattern of cells for sensing said first colour and a third colour.

17. An integrated circuit CMOS sensor according to claim 14 wherein there are provided two said horizontal shift register means for reading the outputs from the sensing cells of respective ones of said two interspersed series of cells in every row of the array.

18. An integrated circuit CMOS sensor according to claim 1 wherein the sensor is capable of sensing infra-red radiation.

19. An integrated circuit CMOS sensor according to claim 1 wherein said sensing cells comprise pixels having sensing surfaces responsive to different predetermined radiation wavelengths.

20. An integrated circuit CMOS sensor according to claim 1 wherein said sensing cells comprise pixels provided with respective filters for enabling said pixels to sense radiation corresponding to different wavelengths.

21. An integrated circuit CMOS sensor according to claim 1 wherein each said sensing cell is capable of sensing radiation over a predetermined band of wavelengths.

22. An integrated circuit CMOS sensor according to claim 21 wherein said array of sensing cells comprises an array of pixels provided with a matrixed pattern of red, green and blue colour filters.

23. An integrated circuit CMOS sensor according to claim 21 wherein said array of sensing cells comprises an array of pixels provided with a matrixed pattern of cyan, magenta and yellow colour filters.

24. An integrated circuit CMOS sensor according to claim 1 wherein said array of sensing cells contains at least one sensing cell for use in sensing light intensity.

25. A solid state camera head incorporating at least one lens and an integrated circuit sensor according to claim 1.

26. A solid state camera system having a plurality of channels for radiation of different wavelengths, incorporating an integrated circuit CMOS sensor according to claim 1.

27. A solid state camera system according to claim 26, further including signal processing means adapted to receive the sensing cell output signals read consecutively from the cells in each one of said plurality of series of cells in the or each said row and demultiplex them into respective ones of said plurality of channels for radiation of different wavelengths.

28. A solid state camera system according to claim 27, wherein said sensing cell output signals are analogue signals and the system further includes analogue to digital (A/D) signal converter means for converting said analogue signals to digital signal which are received by said signal processing means.

29. A solid state camera system according to claim 28 wherein said A/D signal converter means are included in said integrated circuit CMOS sensor.

30. A method of reading outputs of individual sensing cells of an array of sensing cells fabricated in an integrated circuit CMOS muti-spectral image array sensor for use in a solid state camera system having a plurality of channels for radiation of different wavelenghts, the array comprising at least one row of sensing cells, said at least one row containing a plurality of series of sensing cells which series are interspersed with each other in a predetermined manner and each series consisting essentially of sensing cells for a respective one of said plurality of channels, and read out means for selectively reading signal outputs from the cells in said at least one cell row of the array, wherein the method comprises reading out selectively the signal outputs from the sensing cells in one of said plurality of series of cells in said at least one row, with the cells in said series being read out consecutively, and then to read out selectively and consecutively the signal outputs from the sensing cells in another one of said series of cells, via a signal common read out line coupled to the sensing cells in each one of said plurality of series of cells so that the signal outputs from the series of sensing cells for each said channel are read as a consecutive series separately from a consecutive series of signal outputs from the series of sensing cells for another said channel.

31. A method according to claim 30, wherein separate horizontal shift register means are used to read the cell output signals from the cells of respective ones of said plurality of interspersed series of cells in said at least one row.

32. A method according to claim 30, wherein the array of sensing cells is a two-dimensional array having a plurality of rows and columns, each row containing a plurality of series of sensing cells which series are interspersed with each other in a predetermined manner, each series consisting essentially of sensing cells for a respective one of said plurality of channels, and the method comprises reading consecutively the sensing cell output signals from the cells in each one of said plurality of series of cells in each row.

33. A method according to claim 30, wherein said single common read out line is connected to a respective single output of the array and wherein sensing cell output signals from the cells in each one of said plurality of series of cells in said at least one row are read consecutively into signal processing means coupled to said output of the array and which are adapted to demultiplex said sensing cell output signals into respective ones of said plurality of channels for radiation of different wavelengths.

34. A method according to claim 33, wherein said sensing cell output signals are analogue signals which are converted to digital signals before being demultiplexed into said plurality of channels.

35. A method according to claim 30, wherein said single common read out line is connected to a respective single output of the array and wherein sensing cell output signals from the cells in each one of said plurality of series of cells in said at least one row are read consecutively into a data recording means connected to said output of the array, for recording said consecutively arranged sensing cell output signals from the cells in each one of said plurality of series of cells.

36. Signal processing means suitable for use in a solid state CMOS camera system and adapted to receive and demultiplex streams of output signals from sensing cells of an integrated circuit CMOS image sensing array of the camera system, said array having at least one row of sensing cells containing a plurality of series of sensing cells interspersed in a predetermined manner, each series consisting essentially of sensing cells for a respective one of a plurality of channels for radiation of different wavelengths in the solid state camera system, said signal processing means being adapted to demultiplex a shuffled stream of output signals from sensing cells in said at least one row into respective ones of said plurality of channels, in which shuffled stream of output signals the output signals from the sensing cells in each one of said plurality of series of cells in said at least one row are arranged consecutively.

37. Signal processing means according to claim 36, adapted to receive streams of output signals from each row of a two-dimensional image sensing array of the solid state camera system, each row comprising a plurality of series of sensing cells interspersed with each other in a predetermined manner and each series consisting essentially of sensing cells for a respective one of said plurality of channels, said signal processing means being adapted to demultiplex a shuffled stream of sensing cell output signal from each row into respective ones of said plurality of channels, wherein in each shuffled stream of output signals the output signals from the sensing cells in each one of said plurality of series of cells in the respective row are arranged consecutively.

* * * * *

UNITED STATES PATENT AND TRADEMARK OFFICE
CERTIFICATE OF CORRECTION

PATENT NO.    : 6,486,911 B1
DATED         : November 26, 2002
INVENTOR(S)   : Denyer et al.

It is certified that error appears in the above-identified patent and that said Letters Patent is hereby corrected as shown below:

Column 9,
Line 1, after "of" insert -- series of --;
Line 11, after "selectively" insert -- and consecutively --.

Column 10,
Line 2, "comprising" should read -- comprises --.

Signed and Sealed this

Fourth Day of March, 2003

JAMES E. ROGAN
*Director of the United States Patent and Trademark Office*